(12) United States Patent
LeBlanc et al.

(10) Patent No.: US 8,516,096 B2
(45) Date of Patent: Aug. 20, 2013

(54) COGNITIVE WIRELESS SYSTEM

(75) Inventors: Lawrence Joseph LeBlanc, New Westminster (CA); Eddie Shek Cheung Ho, Burnaby (CA); Kirk Arnold Moir, New Westminster (CA)

(73) Assignee: In Motion Technology Inc., New Westminster (CA)

( * ) Notice: Subject to any disclaimer, the term of this patent is extended or adjusted under 35 U.S.C. 154(b) by 1108 days.

(21) Appl. No.: 12/289,165

(22) Filed: Oct. 22, 2008

(65) Prior Publication Data

US 2010/0008291 A1 Jan. 14, 2010

Related U.S. Application Data

(60) Provisional application No. 61/129,638, filed on Jul. 9, 2008.

(51) Int. Cl.
*G06F 15/167* (2006.01)
(52) U.S. Cl.
USPC ............ 709/223; 709/224; 370/328; 714/748
(58) Field of Classification Search
USPC .......................... 709/223–224, 227–228, 249
See application file for complete search history.

(56) References Cited

U.S. PATENT DOCUMENTS

| | | | |
|---|---|---|---|
| 6,757,269 B2 * | 6/2004 | Dorenbosch et al. ......... 370/338 | |
| 6,775,267 B1 | 8/2004 | Kung | |
| 6,832,087 B2 | 12/2004 | Gwon et al. | |
| 6,862,274 B1 | 3/2005 | Tsao | |
| 6,880,009 B2 | 4/2005 | Charas | |
| 6,898,432 B1 * | 5/2005 | Jiang ........................ | 455/456.1 |
| 6,907,501 B2 | 6/2005 | Tariq et al. | |
| 6,910,074 B1 | 6/2005 | Amin | |
| 7,054,843 B2 | 5/2006 | Charas | |
| 7,069,045 B2 | 6/2006 | Wu et al. | |
| 7,079,499 B1 | 7/2006 | Akhtar | |
| 7,149,521 B2 | 12/2006 | Sundar et al. | |
| 7,164,912 B2 | 1/2007 | Buckley et al. | |
| 7,224,964 B2 | 5/2007 | Souissi et al. | |
| 7,239,632 B2 | 7/2007 | Kalavade et al. | |
| 7,254,387 B2 | 8/2007 | Dunlop et al. | |
| 7,263,353 B2 | 8/2007 | Forsberg et al. | |
| 7,283,803 B2 | 10/2007 | Karaoguz | |
| 7,295,530 B2 | 11/2007 | Chu et al. | |
| 7,313,628 B2 | 12/2007 | Chaskar et al. | |
| 7,315,750 B2 | 1/2008 | Chou | |
| 7,318,111 B2 * | 1/2008 | Zhao ........................ | 709/250 |
| 7,356,013 B2 | 4/2008 | Linder et al. | |
| 7,356,015 B2 | 4/2008 | Ibe et al. | |
| 2002/0152319 A1 | 10/2002 | Amin | |
| 2003/0100308 A1 * | 5/2003 | Rusch ....................... | 455/445 |
| 2003/0139187 A1 | 7/2003 | Zhang | |
| 2003/0224788 A1 * | 12/2003 | Leung et al. ............... | 455/435.1 |
| 2004/0203800 A1 | 10/2004 | Myhre | |
| 2004/0205158 A1 | 10/2004 | Hsu | |
| 2004/2059545 | 12/2004 | Kugo | |

(Continued)

FOREIGN PATENT DOCUMENTS

EP 1947892 A1 7/2008
EP 1947894 A2 7/2008

(Continued)

*Primary Examiner* — Abdullahi Salad

(57) ABSTRACT

A cognitive mobile wireless system is disclosed that enhances connectivity of a mobile device moving among heterogeneous networks, by selecting advantageous links.

3 Claims, 9 Drawing Sheets

Dynamic Multi-Streaming

(56) References Cited

U.S. PATENT DOCUMENTS

| | | |
|---|---|---|
| 2005/0043026 A1 | 2/2005 | Brook et al. |
| 2005/0047373 A1 | 3/2005 | Kojima |
| 2005/0197748 A1 | 9/2005 | Holst |
| 2006/0007878 A1 | 1/2006 | Xu et al. |
| 2006/0039335 A1* | 2/2006 | Ono et al. .................. 370/338 |
| 2006/0052104 A1 | 3/2006 | Kono |
| 2006/0099953 A1 | 5/2006 | Mansour |
| 2006/0187873 A1 | 8/2006 | Friday |
| 2006/0199608 A1 | 9/2006 | Dunn et al. |
| 2006/0205392 A1 | 9/2006 | Jagadeesan et al. |
| 2006/0258361 A1 | 11/2006 | Iyer et al. |
| 2006/0280146 A1* | 12/2006 | Koodli et al. ................ 370/331 |
| 2007/0038759 A1 | 2/2007 | Hanson |
| 2007/0109119 A1* | 5/2007 | Zhang et al. ............ 340/539.22 |
| 2007/0123259 A1 | 5/2007 | Huang et al. |
| 2007/0133450 A1 | 6/2007 | Hidaka |
| 2007/0160017 A1 | 7/2007 | Meier et al. |
| 2007/0161375 A1 | 7/2007 | Danzeisen |
| 2007/0177557 A1 | 8/2007 | Mukherjee et al. |
| 2007/0183364 A1 | 8/2007 | Donovan et al. |
| 2007/0195765 A1 | 8/2007 | Heissenbuttel |
| 2007/0202873 A1 | 8/2007 | Yegani et al. |
| 2007/0217411 A1 | 9/2007 | Danzeisen |
| 2008/0014936 A1 | 1/2008 | Fang |
| 2008/0039079 A1* | 2/2008 | Iyer et al. .................. 455/432.1 |
| 2008/0056212 A1* | 3/2008 | Karaoguz et al. ............. 370/338 |
| 2008/0062934 A1 | 3/2008 | Zhao |
| 2008/0119183 A1 | 5/2008 | Kono |
| 2008/0130558 A1 | 6/2008 | Lee |
| 2008/0139242 A1 | 6/2008 | Hidaka |
| 2008/0186930 A1* | 8/2008 | Choi et al. .................. 370/338 |
| 2008/0294793 A1* | 11/2008 | Han et al. ..................... 709/235 |
| 2008/0304434 A1* | 12/2008 | Giaretta et al. ............... 370/313 |
| 2009/0201855 A1* | 8/2009 | Weniger et al. ............... 370/328 |
| 2009/0213787 A1 | 8/2009 | Saito et al. |
| 2010/0022243 A1* | 1/2010 | Oommen et al. .......... 455/435.3 |
| 2010/0090841 A1* | 4/2010 | Zhang et al. .................. 340/603 |
| 2010/0165947 A1* | 7/2010 | Taniuchi et al. ............... 370/331 |
| 2010/0241737 A1* | 9/2010 | Hirano et al. ................ 709/220 |
| 2010/0268583 A1* | 10/2010 | Backman ..................... 705/14.4 |

FOREIGN PATENT DOCUMENTS

| | | |
|---|---|---|
| EP | 1980070 A2 | 10/2008 |
| EP | 2079199 A1 | 7/2009 |
| EP | 2090133 A2 | 8/2009 |
| EP | 2100470 A2 | 9/2009 |

\* cited by examiner

Context

Basic Mobility View

Seamless Mobility View

Dynamic Multi-Streaming

Mobile Agent Architecture: Based on 802.21

COGNITIVE WIRELESS SYSTEM

CROSS REFERENCE TO RELATED APPLICATIONS

This application claims the benefit of U.S. provisional application No. 61/129,638, filed on Jul. 9, 2008, 2008, which is incorporated by reference in its entirety herein.

FIELD OF THE INVENTION

The present invention relates to mobile terminals operating among heterogeneous networks.

BACKGROUND OF THE INVENTION

Wireless service providers face a network capacity shortfall due to a dramatic increase in both the number of mobile devices in use and their ability to generate and/or consume large amounts of data. The combination of these factors produces a demand that far outstrips the capacity expansion possible through evolution of any single network technology.

One way to address this capacity shortfall is through efficient and effective use of multiple, heterogeneous networks. In particular, the use of short range wireless technologies like WiFi offers significant capacity expansion through frequency reuse. With a typical 500 foot coverage radius, approximately 100 WiFi access points can be deployed in the same area as a single cell site with a 1 mile coverage radius, and each WiFi access point can deliver as much or more capacity than the entire cell site.

Unfortunately, short range, or "high density" network technologies present some significant problems for wireless service providers and their customers, including (but not limited to): (1) poor mobility characteristics due to the need for frequent and rapid switching; (2) poor propagation characteristics, particularly when using unlicensed and/or power-limited spectrum; and (3) maintenance headaches due to many more points of failure (2+ orders of magnitude).

Current attempts in multiple-network scenarios are driven from higher-level applications or processes above the datalink layer (for example, U.S. Pat. No. 7,263,252) or require much "command and control" interaction from a central network (or supra-network) managing station. Accordingly, responsiveness to local conditions or context, is reduced. The present invention addresses the responsiveness issues by centering the decision-making at the mobile terminal.

The present invention, a Cognitive Wireless System (CWS), addresses these and other issues to allow wireless service providers to make effective use of multiple networks.

SUMMARY OF THE INVENTION

There is provided a cognitive wireless system for a mobile node (MN) to operate dynamically with heterogeneous networks, comprising: (a) a first network with characteristics, and a second network with different characteristics; (b) a first mobile node (MN) that has a policy of using said first network as a default; (c) said first mobile node (MN) having an associated first application with requirements,
wherein said first mobile node (MN) monitors the contextual factors of (i) link assessment factor associated with said first default network and link assessment factor associated with said second network; and one or more of (ii) environmental factor, (iii) application factor, and (iv) cost factor; and wherein said first mobile node (MN) has a link selector that operates on said policy in real time on said contextual factors, and selects said second network to use instead of said first default network by taking into account the user's intentions as inferred by those of said contextual factors whose values are derived by the user's mobility actions with said first Mobile Node (MN); wherein said user's mobility actions with said first mobile node (MN) include the speed of said first mobile node (MN); and (d) a seamless mobility agent (SMA) to act as a virtual network interface (VNIC) which acts as a proxy for said first mobile node (MN) when interacting with its correspondent node (CN), wherein said first mobile node (MN) has a mobile agent (MA) that has an IP Mobility layer, and said seamless mobility agent (SMA) has a corresponding IP Mobility Home Agent (HA), and said first mobile node mobile agent (MA) registers a plurality of multiple care-of-addresses (CoAs) with said IP Mobility Home Agent (HA), and said mobile agent (MA) sends a message by redundantly and simultaneously streaming the message using said plurality of care-of-addresses (CoAs).

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT NOTICE REGARDING COPYRIGHTED MATERIAL

A portion of the disclosure of this patent document contains material which is subject to copyright protection. The copyright owner has no objection to the facsimile reproduction by anyone of the patent document or the patent disclosure as it appears in the Patent and Trademark Office file or records, but otherwise reserves all copyright rights whatsoever.

Figure 1:
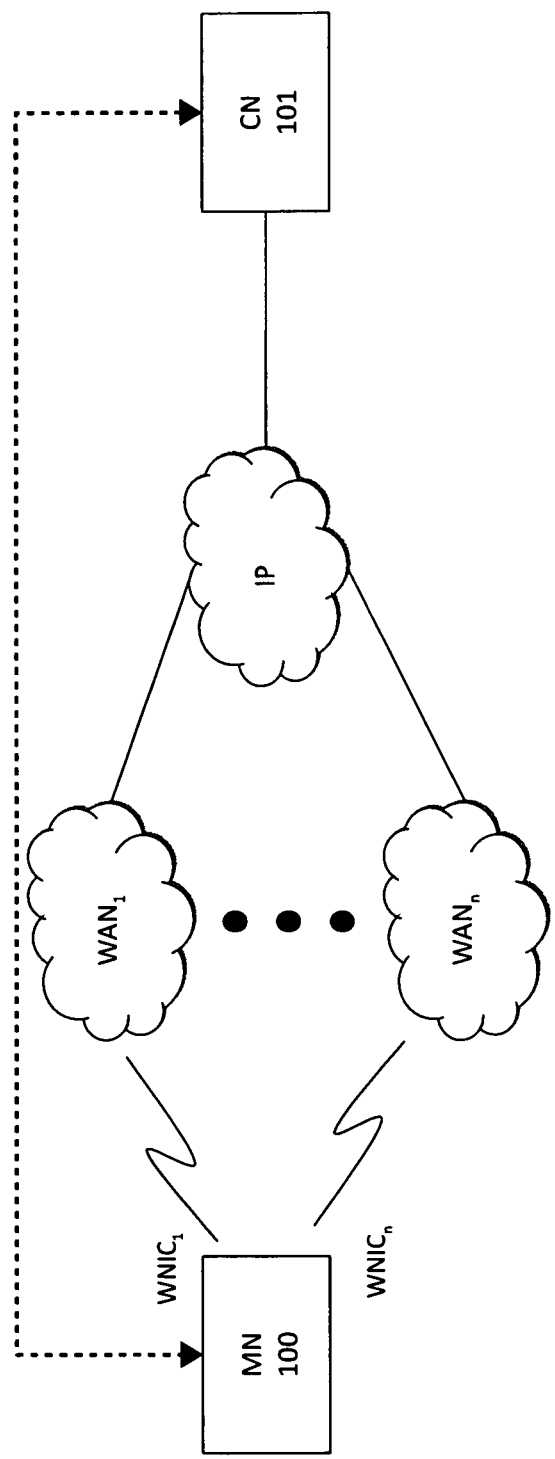
FIG. 1 is a block diagram illustrating an architecture of an exemplary communications system in which a representative embodiment of the present invention may be practiced.
Figure 2:
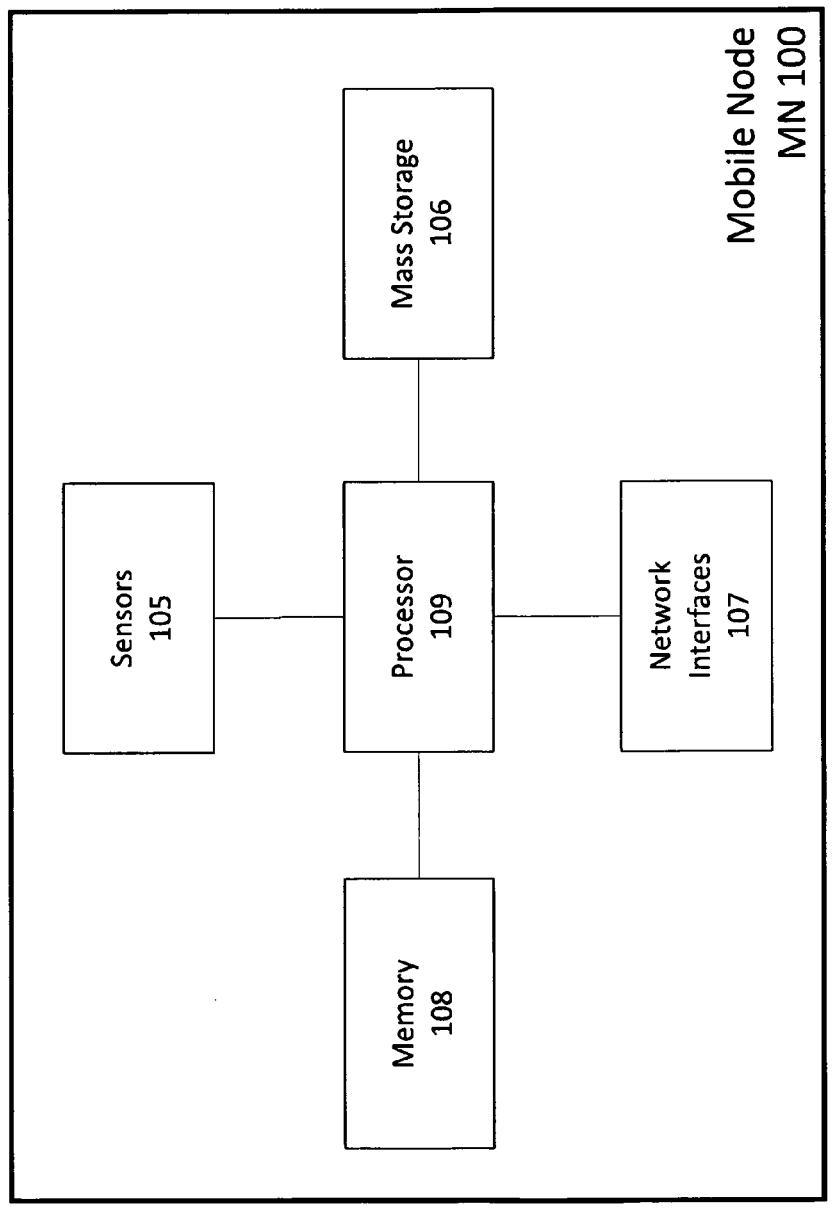
FIG. 2 is a schematic block diagram of a hardware architecture of one embodiment of a Mobile Node (MN) 100.
Figure 4:
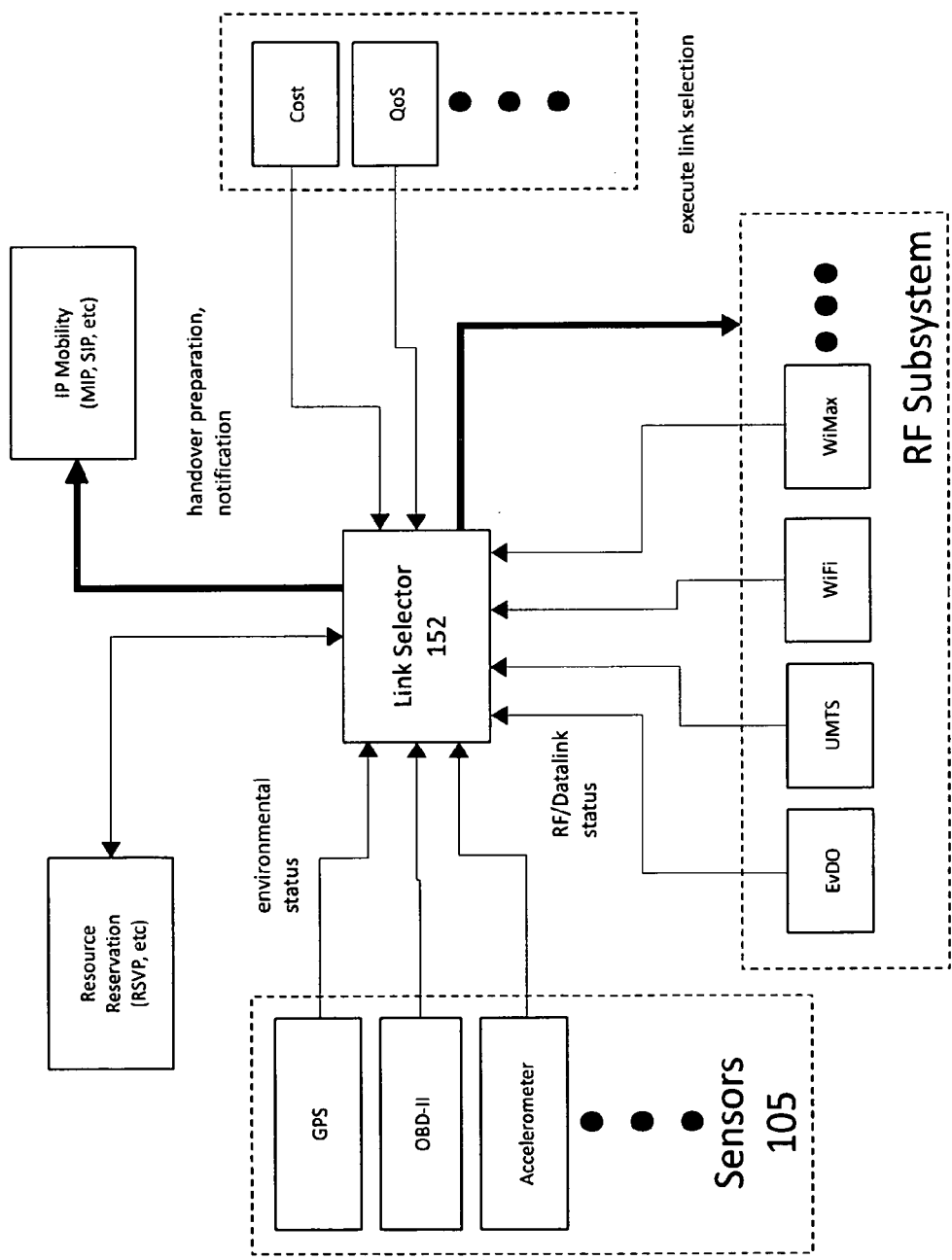
FIG. 4 is a schematic block diagram of the Link Selector

An overview is first provided in conjunction with FIGS. 1, 2 and 4, followed by a more detailed explanation organized as Dynamic Link Selector, Seamless Mobility Agent, Dynamic Multi-Streaming and Network Health.

FIG. 1 shows an overview architecture of the present invention. A Mobile Node (MN) 100, equipped with a plurality of wireless network interfaces (WNICx), interacts with a Correspondent Node (CN) 101 through a plurality of wireless networks (WANx) and IP infrastructure. According to the present invention, the MN 100 selects (by itself, based on contextual factors and other conditions local to it, according to its then operating policy 205) the optimal wireless network(s) WANx over which to exchange data with the Correspondent Node (CN) 101. Herein, "policy" and "contextual factors" refers to process(es) by which a MN 100 selects link(s) at any given time, taking into account the context of the MN 100 then, and also to other aspects of its operation (e.g. usage that restricts streaming video to Wi-Fi only). Policy 205 and contextual factors, as will be explained in more detail below, are instantiated by algorithms implemented in software/hardware in interaction with local conditions. FIG. 2 shows the schematic block diagram of a hardware architecture of one embodiment of a MN 100 that is suitable for a vehicle. There is a powerful CPU 109 and associated memory 108 for inputting data from sensors 105 and selecting the appropriate link and interacting with network interfaces 107 that correspond to the WNICx. Mass storage 106 may be provided to store sensor 105 data for future reference.

FIG. 4 shows the various inputs into the Link Selector 152. The Link Selector 152 executes (its then operating) policy 205 to select which link(s) to use for carrying traffic. It takes into account when executing policy 205

(1) local environmental conditions such as location (e.g. GPS), operating status (e.g. vehicle gear selection via OBD-II sensors at 105), and motion (eg. accelerometer); and (2) current RF conditions as well as datalink conditions (QoS) from each network interface (EvDO, UMTS, etc.). These non-limiting examples will be explained in more detail below.

Link Selector 152 may act as an admission-control module for standard resource reservation protocols (e.g. RSVP), and if the then operating policy 205 stipulates, may take application resource requests into account when selecting a link.

Link Selector 152 notifies standard IP Mobility mechanisms (such as Mobile IP and SIP) when it is about to change network attachment (handover preparation) and/or when it has completed such a change (handover notification)

The CWS Network includes: (1) a Mobility Manager (MM) 200 resident in the wireless network infrastructure (whether of the telecom provider or of the CWS Network system operator command and management structure, such as a central station); and (2) a Mobility Agent (MA) 150 resident on a mobile wireless device (MNs 100), of which there is typically a plurality.

The Mobility Manager (MM) 200 defines CWS Network system-wide policies and distributes same to the Mobility Agents (MA) 150. In addition, the Mobility Manager (MM) 200 receives network health feedback from Mobility Agents (MA) 150 and redistributes that information to affected Mobility Agents (MA) 150 through policy 205 updates and/or alerts.

The Mobility Agent (MA) 150 is responsible for selecting the appropriate wireless link(s) for its Mobile Node (MN) 100 use at any point in time, and to notify the IP Mobility layer (if one is deployed) of changes in the current network access path to enable seamless session continuity. The Mobility Agent (MA) 150 operates on policy(ies) 205 that take one or several contextual factors into account when selecting (by its Dynamic Link Selector/algorithms) a network link among a choice of links where each link has sufficient quality to qualify as a possible selection (whether that sufficiency is measured by lower level quality metrics or is influenced by higher level, application-specific metrics). The Mobility Manager (MM) 200 is responsible for maintaining the global policy(ies) 205 of the CWS Network and for distribution (and updating or modification) of policy(ies) 205 to individual Mobility Agents (MA) 150.

These contextual factors can be grouped into (informally expressed and not mutually exclusive) categories including (but not limited to) the following four, and one or more contextual factors are used as best optimizes performance for anticipated real-time scenarios.

Link Assessment. The Mobility Agent (MA) 150 takes into account network availability and signal quality (Layer 1), datalink quality (Layer 2) and IP performance characteristics such as latency and throughput (Layer 3) when selecting a link. Links that have inferior performance may be disqualified from selection even when the default or base policy 205 dictates they be used.

Environment. Environmental factors including (but not limited to) location, speed and battery power levels, provide context within which the Mobility Agent (MA) 150 can interpret policy 205 to improve network selection. For example, the default or base policy 205 may dictate that a Wi-Fi network is preferred whenever available, but the policy 205 may allow Mobility Agent(MA) 150 to ignore Wi-Fi networks when in motion because Wi-Fi networks have inferior mobility characteristics. If the Mobility Agent (MA) 150 is installed in a vehicle, it may, according to the policy 205, consult vehicle-specific parameters, such as gear selection. For example, a stationary vehicle in "Park" may be reasonably expected to remain stationary, whereas one in "Drive" may be stopped momentarily at a traffic light. In the former case, the Mobility Agent (MA) 150 may choose to use an available Wi-Fi connection, but in the latter case, it may choose to use a cellular data connection with better mobility characteristics.

Application Factors. A policy 205 may indicate use of a particular default network connection (for example, based on lower cost) but that is unsuitable for a given application that must operate in real-time critical situations. The Mobility Agent (MA) 150 can evaluate the factors of an application (its requirements and its desired level of service) and modify its network selection accordingly. For example, in an ambulance emergency environment, the ECG (electrocardiogram) data may be defined as the highest priority data and recognized as such by the policy 205, so that the Link Selector 152 will send it via the best available network interface in precedence over (and perhaps regardless of other contextual factors (like cost). Other application data may be less time sensitive and so is given weight by the policy 205 as desirable but not determinative of the link selection.

Cost is another contextual factor. Operating among heterogeneous networks, some networks have their own telecom service providers (e.g. cellular system provider) and associated costs. These costs may be fixed by published tariffs or may be dynamic (based on real time factors, like time of use). For consumer or other end users and applications that are cost-sensitive, the CWS Network system operator may set (and later update or modify) a policy 205 that gives much weight to minimizing cost (or keeping costs to a contractually promised level) and consequently, would select links with less performance but were cheaper.

The contextual factors can be employed in different combinations and with different weights, as the CWS Network system operator architects for his desired scenario outcomes. Consider the two preceding and opposed examples above, where link performance factor trumps cost factor and vice versa.

Dynamic Link Selector

A popular method for selecting between multiple connection options involves assigning a preference score (typically linked to cost or performance, as detailed below in examples) for each link and then selecting the highest scoring link relative to a base or default preference link (assigned by the CWS Network system operator). In a mobile/wireless environment a static link preference is often suboptimal because the best link tends to change depending on a wide array of contextual factors including (but not limited to): location, speed, time-of-day, link QoS, application requirements and application preferences (e.g. security, transmission bandwidth, cost). A mechanism for specifying a dynamic preference score for each link option is required for optimal results.

There is provided: a mechanism for defining a base preference for a communication link; and a mechanism for using a link other than the base preference, based on arbitrary, variable attributes such that when a policy 205 is executed with current value(s) of the contextual factor(s), it generates a preference score adjustment (±) for each link option.

A Dynamic Link Selector 152 resides in the Mobile Node (MN) 100 that selects the link to be used in real time by executing one or more policies that take into account, contextual factors (some whose values vary in real time, some whose values are assigned arbitrarily by the CWS Network system operator) and applying the resulting policy 205 "scores" relative to the base preference link, i.e. to use another link or not, and when to return to the base preference link. Below are examples of the dynamic selection of links, the first based on recent historical "up time" and the second based on the speed-sensitivity of the Mobile Node (MN) 100.

For example, a policy 205 generates a preference score adjustment of −3 for each link upon notification of a link failure event, and a preference score adjustment of +1 for each minute of connection uptime up to a maximum equal to the base preference link. In this case, if the Wi-Fi link fails, its preference score would drop from 10 to 7 and the EvDO link would become active. One minute after the Wi-Fi link recovered, its preference score would be updated to 8, equal to the EvDO link. Traffic would not yet switch. If the Wi-Fi link failed at this point, its preference score would drop to 5. Four minutes after recovery, the Wi-Fi link would achieve a preference score of 9, and traffic would once again switch back to Wi-Fi.

For the second example, consider that high-density networks such as municipal Wi-Fi deployments provide higher throughput and overall capacity than conventional macro-cellular systems due to their high degree of spectrum re-use. However such networks have problems dealing with mobile users, particularly ones traveling in vehicles, due to rapid switching requirements. A Wi-Fi AP under optimal conditions can sustain performance over a range of about 305 meters (or 1000 feet). at best. If a vehicle travels at about 48 km/hour (or 30 mph), it covers about 305 meters (or about 1000 ft). every 22 seconds; at 96 km/hour (or about 60 mph) the window shrinks to 11 seconds. This puts a burden both on the client—to scan at a high enough rate to detect new APs and reliably predict which of several available APs to switch to before losing the existing AP connection—and on the network—to update bridging/routing rules to track the client as it moves from AP to AP.

Ideally, a Mobile Node (MN) 100 will take advantage of the high-density network when stopped or moving at a reasonable speed and switch to an alternate network with better mobility characteristics when it begins moving.

Accordingly, there is provided: a Mobile Node (MN) 100 equipped with multiple wireless interfaces; and a mechanism for specifying preference for one interface over another; mechanism for specifying the relationship between speed and the aforementioned preference; and a mechanism for measuring the speed at which the Mobile Node (MN) 100 is moving (e.g. GPS, OBD-II)

Optionally, there is provided a mechanism to infer the intent of the user of the MN 100 about continuing to move or to continue to rest (e.g. gear selection, braking status, location).

For example, MN 100 is equipped with two wireless interfaces—an IEEE 802.11g Wi-Fi interface and an EvDO interface. The device also has embedded GPS capabilities to determine speed. The 802.11g interface is configured with a default preference score of 100 while the EvDO interface is configured with a default score of 90. Furthermore, the 802.11g interface is configured with a preference penalty of −1.25 km/hour (or about −2/mph). So at 8+km/hour (or about 5+mph) the EvDO link becomes the preferred network and the Mobile Node (MN) 100 switches traffic to that interface. When the Mobile Node (MN) 100 slows to <=5 mph, the MN-Mobile Node (MN) 100 switches back to Wi-Fi (if available).

The examples above are simple non-limiting ones that show a granular implementation of the policy 205 aspects of the Link Selector 152. The CWS Network system operator may develop a policy or policies 205 that take into account many contextual factors and relate them—by Boolean algebra, by fuzzy logic, non-linearly, by applying different weights to each—as can best optimize performance for the anticipated subject field scenarios.

Seamless Mobility Agent

The Mobility Manager (MM) 200 can provide or host several services. First, it can host the Seamless Mobility Agent (SMA) 151, which in turn may be part of the Dynamic Multi-streaming, and the Network Health service, all explained below. Secondly, it may provide QoS feedback for the MN/MA Link Selector 152. Thirdly, it hosts CWS Network management functions that support the aforementioned services (e.g. a reporting engine to provide real-time and historical correlation of network events with geographic location, speed, and other environmental factors to help improve the accuracy and efficiency of Link Selector 152 algorithms; verification of service level agreements between the telecom wireless network provider(s) and the user(s)).

Note that some or all of the Mobility Manager (MM) 200 services described can be hosted by a telecom provider or by the CWS Network system operator's central station.

Figure 3A:
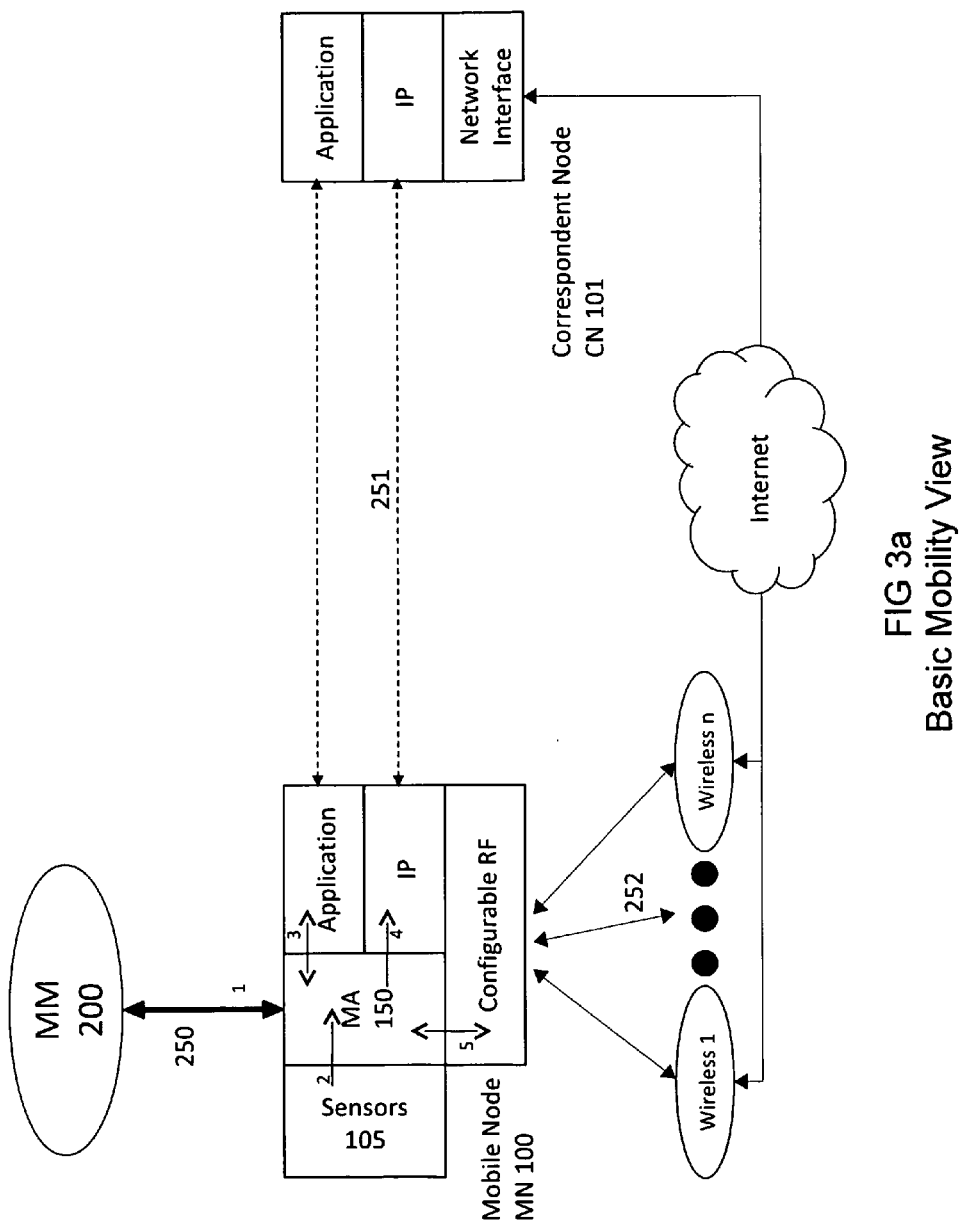
FIG. 3a is a diagram showing the layered data and control flow in the multi-network mobility management for basic mobility.
Figure 3B:
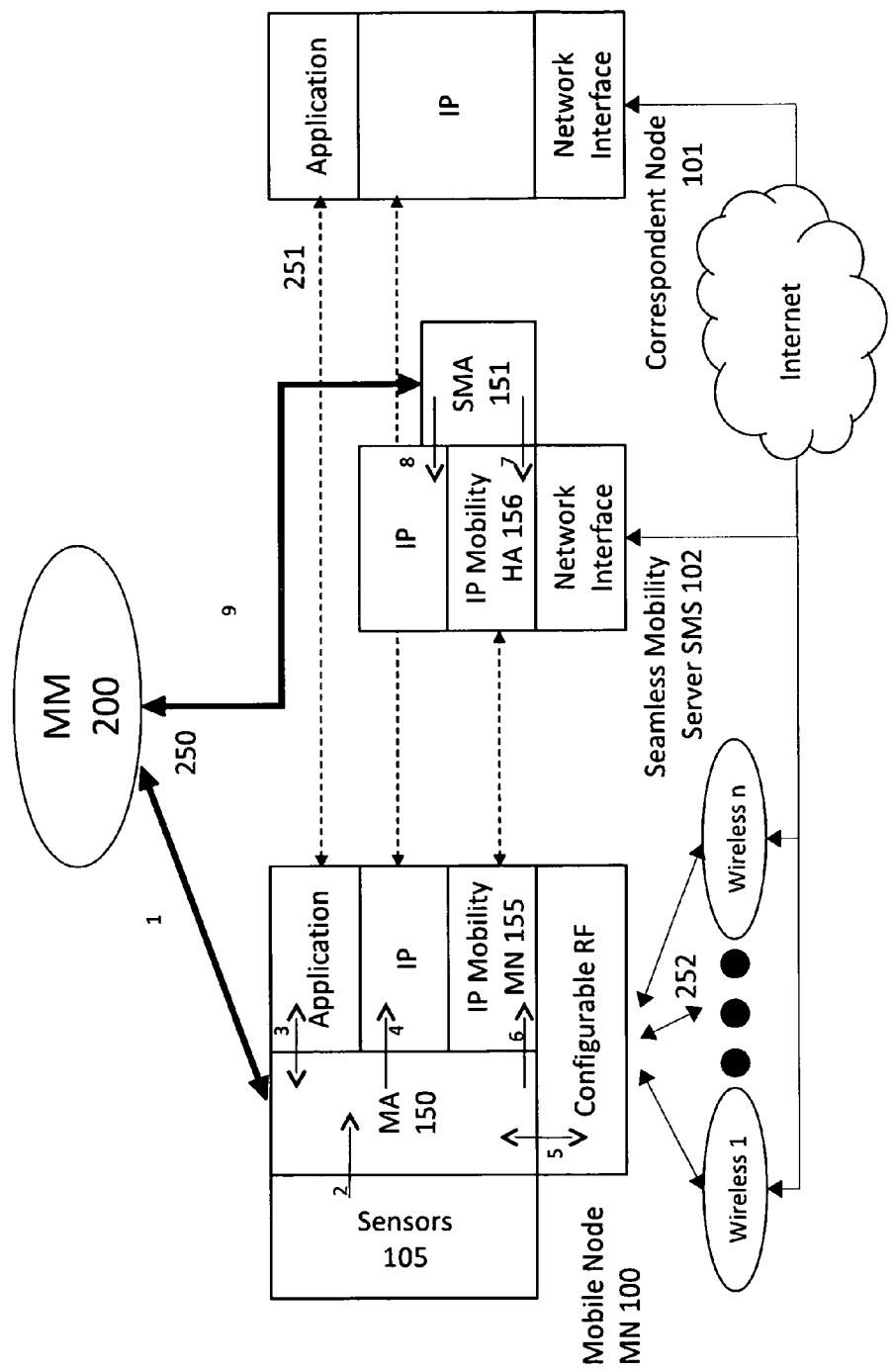
FIG. 3b is a diagram showing the layered data and control flow in the multi-network mobility management for seamless mobility.

With reference to FIGS. 3a and 3b, the Seamless Mobile Agent (SMA) 151 provides several services. First, it acts as a virtual network interface (VNIC) which acts as a proxy for the Mobile Node (MN) 100, in effect hiding the various WANxs over which the MN 100 is communicating with the GNI Correspondent Node (CN) 101. In particular, it and the MN 100 cooperate to provide multi-streaming (i.e. distribute traffic from an MN 100 redundantly over multiple WANx and have it consolidated by the Seamless Mobile Agent (SMA) 151 into a single stream) to enhance reliability of communications and minimize or eliminate switching time to provide true seamlessness.

FIG. 3a shows the data and control flow of the deployment scenario for applications that are tolerant of IP address changes, connection dropouts and the like (for examples, basic web surfing, email, etc.).

Interface 1: MM 200↔MA 150. This is the control plane interface used for distribution of policy 205 (MM 200→MA 150) and collection of network health information (MA 150→MM 200), with more details explained below in connection with network health.

Interface 2: Sensors 105→MA 150. The sensors 105 provide environmental inputs (location, speed, gear selection via OBD-II, and the like related to a vehicle which transports the MN 100) for use in link selection (i.e. contextual factors for the Link Selector 152).

Interface 3: MA 150⇆Application. Optional interface used to allow applications to request link QoS parameters and for the MA 150 to advise applications of current connectivity state.

Interface 4: MA 150→IP. The MA 150 manipulates routing, firewall, and other IP-layer parameters based on current link selection and usage (eg. streaming video only allowed on Wi-Fi, etc).

Interface 5: MA 150⇆Configurable RF. The MA 150 receives RF status information (for examples, availability, QoS) and executes changes to the RF layer as required. Configurable RF could be SDR or selectable hardware implemented RF boards or a combination of both.

FIG. 3b shows the data and control flow in the deployment scenario for applications that are not tolerant of IP address changes and/or connection dropouts (eg. VoIP, streaming audio/video, etc).

Seamless Mobility Server (SMS) 102 is introduced to provide an anchor point in the network to hide the existence/use of multiple wireless network interfaces from the Correspondent Node (CN) 101.

SMS 102 hosts an IP Mobility Home Agent (or HA 156), and the Seamless Mobility Agent (SMA 151).

IP Mobility may be provided by standard components (Mobile IP, MOBIKE, etc) or by the Dynamic Multi-Streaming Protocol (see FIGS. 5 and 6 and explanation below).

Interfaces 1-5 are the same as in FIG. 3a.

Interface 6: MA 150→IP Mobility MN 155. The MA 150 notifies IP Mobility layer of pending or completed vertical handoff.

Interface 7: SMA 151→IP Mobility HA 156. The SMA 151 modifies behavior of IP Mobility HA 156 based on policy 205 and Network Health information provided by the MM 200.

Interface 8: SMA 151→IP. This is the same function as interface 4; SMA 151 adjusts routing, firewall and other Layer 3 parameters based on current link selection and usage policy 205 dictated by MM 200.

Interface 9: MM 200↔SMA 151. Similar to interface 1 in being a control plane interface; MM 200 distributes policy 205 to SMA 151 and collects CWS Network health/utilization information from SMA 151.

In FIGS. 3a and 3b, thick arrows 250 represent CWS Network system control signal channels, dashed arrows 251 represent (Internet model) layer correspondence, and thin arrows 252 represent data traffic and associated protocol-dependent control signals.

Dynamic Multi-Streaming

There are a variety of IP Mobility mechanisms available including Mobile IP (v4/v6), HIP, UMA, etc. In addition there are application-layer session management systems (including SIP, for example). Also, there are attempts at fast-handoff mechanisms to allow for switching between networks. Many of these mechanisms work well when the MN 100 (and/or the network) has the opportunity to "choose" to switch. An example is the UMA scenario of handing off a voice call from a cellular network to a home Wi-Fi network and back. The transition works well from cellular to Wi-Fi because the MN 100 can maintain the cellular connection while preparing for the handover to Wi-Fi. However the reverse transition does not work well because it is difficult to predict accurately when the Wi-Fi connection is going to break.

The standard practice for this scenario is to introduce buffering both at the Mobile Node (MN) and its Home Agent (HA) 156 in the network, allowing traffic flow to be suspended while the network switch is made. Although functional, this approach poses problems for real-time data applications like VoIP and streaming video An alternative to this approach is to redundantly stream packets over multiple networks when available, using a selector mechanism at the far end to take the first copy of a packet to arrive and discard the rest. This removes the need for buffering and/or accurate link failure prediction by ensuring any given packet is "in flight" via multiple paths to minimize/eliminate the impact of a failure of any one path. The downside of such an approach is the substantial expense in power consumption and network capacity utilization.

The present invention extends the concept of "simultaneous binding" found in Mobile IP, which allows a MN 100 to register multiple care-of addresses (CoAs) with its Home Agent (HA) 156 to facilitate rapid switching between them. In Mobile IP with simultaneous binding, one CoA is designated "current" and used for all communications until such time as the MN 100 instructs the Home Agent to begin using an alternate CoA. One can redundantly stream by registering and using all CoAs.

The present invention involves the creation of new service primitives that allow the Home Agent to initiate or terminate simultaneous redundant streaming of data packets over two or more of the available CoAs (i.e. multi-streaming). For example, according to Network Health service (explained below), in order to warn relevant MNs 100 to avoid a particular link, the MM 200 may send alerts or policy 205 updates through simultaneous redundant streaming of data packets over two or more (or all, depending on urgency) of the available CoAs. Similarly, going the other way, a MN 100, upon detecting degraded performance over its preferred link, is equipped to do likewise by initiating simultaneous redundant streaming to MM 200. If the preferred link regains acceptable QoS levels, the MN 100 invokes another service primitive to terminate the multi-streaming. If the selected network continues to degrade and fail, the data traffic is uninterrupted because it is already running on an alternate path(s).

For example, it is more efficient in most cases for a mobile device/MN 100 equipped with both 3G and Wi-Fi network interfaces to use Wi-Fi when available. Systems such as UMA and FMC have been developed to facilitate the handoff of sessions from one network to another in such devices. However performance of such systems is limited by the fact that Wi-Fi links tend to break abruptly, allowing little or no time to prepare for a handoff to a backup network. A common manifestation of this problem is that sessions can be handed off successfully from 3G to Wi-Fi but not in the reverse direction. With dynamic multi-streaming, the MN 100 can take factors other than simple signal availability and/or quality into account. If GPS or accelerometer information is available, a Mobile Node (MN) 100 that is currently using a Wi-Fi connection can begin multi-streaming over cellular as soon as it detects that the device is in motion. If the device comes to rest again without losing the Wi-Fi connection the multi-streaming can be turned off, but if it keeps moving eventually the Wi-Fi link will break and the session will be maintained seamlessly (zero packet loss) via cellular.

Figure 5:
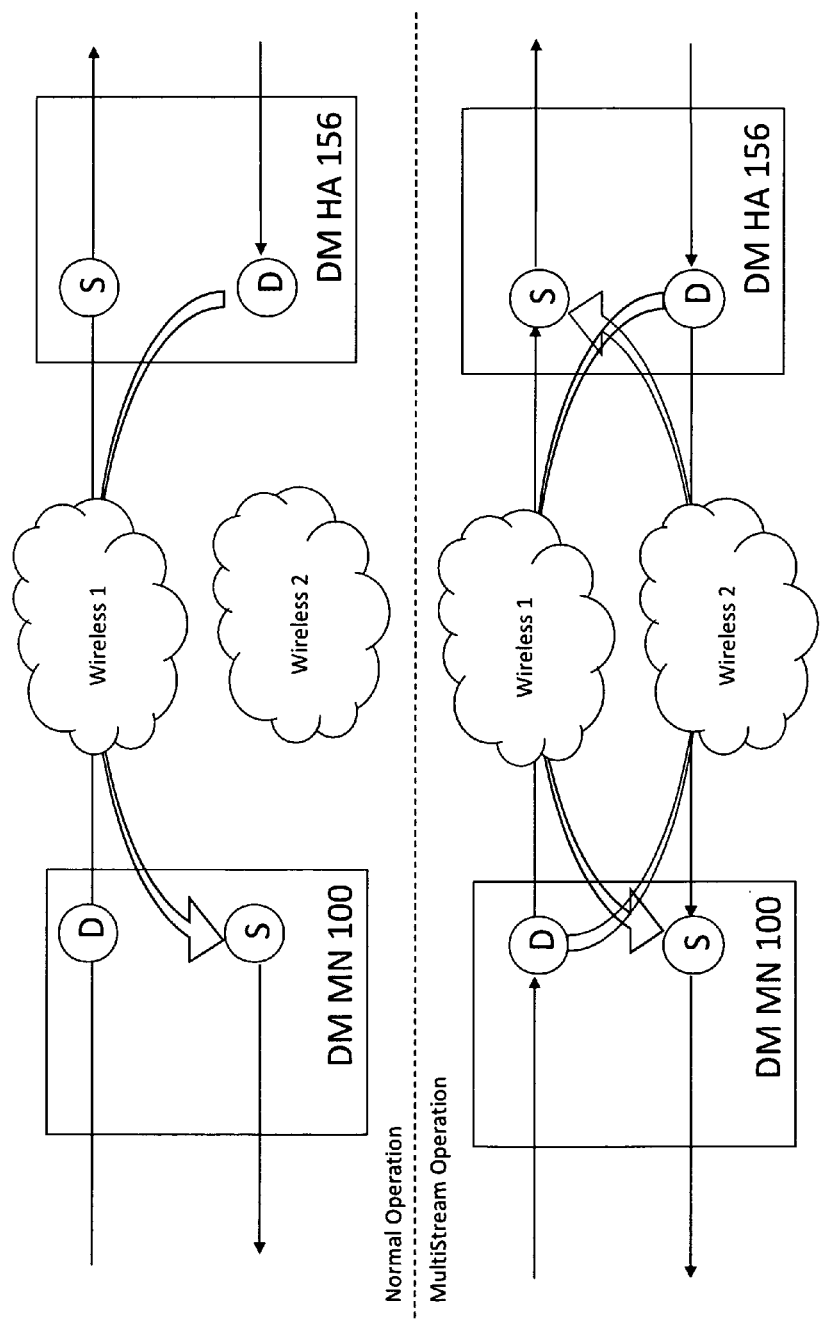
FIG. 5 is a block diagram showing overview of dynamic multi-streaming.

As shown in FIG. 5, each Dynamic Multi-streaming Node has a Packet Selector S and Packet Distributor D. Data being transmitted by the node passes through the Packet Distributor D which decides over which link(s) to send the data. In steady-state Normal Operation, the data is transmitted over only one network interface for efficiency. But if conditions arise (e.g. motion, degraded QoS, etc) that indicate the primary connection is in jeopardy, the Packet Distributor D will begin MultiStream Operation, i.e. redundantly transmitting the data on one or more additional links as necessary, available or instructed. The Packet Distributor D tags each data packet with an identifier so the Packet Selector S on the receive side can select one packet and discard extra copies of packets if they arrive.

The trigger to initiate multi-streaming need not be QoS related; it may be something in the environment that suggests the preferred link has a greater than prescribed risk of failure. For example, Wi-Fi networks tend to break abruptly when the Mobile Node (MN) 100 is in motion, so if the MN-Mobile Node (MN) 100 is able to detect that it is moving then it may start multi-streaming on cellular even though the Wi-Fi link has shown no significant degradation.

Figure 6:
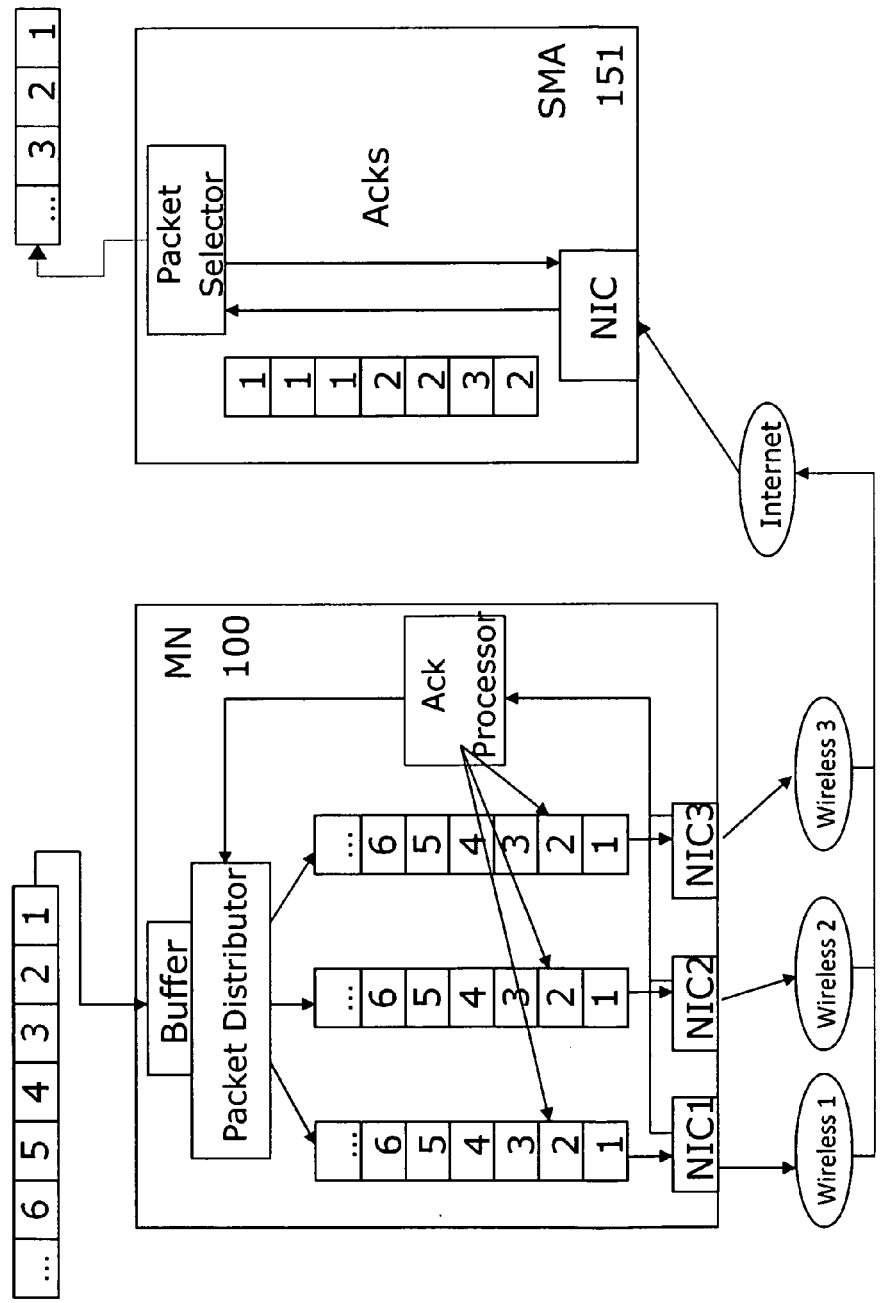
FIG. 6 is a diagram showing an implementation of dynamic multi-streaming.

FIG. 6 shows a possible implementation of the dynamic multi-streaming approach that is not dependent on Mobile IP. For simplicity of illustration, only one direction of data flow (MN 100 to Home Agent (HA) 156) is shown; and no control channel flow, whereby the Mobile Node (MN) 100 coordinates the initiation or termination of multi-streaming, is shown. The "virtual NIC" resides on the MN-Mobile Node (MN) 100. Traffic is buffered and distributed across one or more physical NICs based on policy 205, e.g. preferred NIC only under normal conditions, multiple NICs when preferred network shows signs of degradation. A Packet Selector S on the far end (the IP Mobility Home Agent (HA) 156 or more generally, the Seamless Mobility Agent (SMA) 151) acknowledges each packet upon reception of the first copy; when the virtual NIC receives the acknowledgment, it purges any copies of the packet that may still be in the queue for transmission on slower or redundant links. The uses of redundant multi-streaming explained above with Mobile IP and CoAs, are equally applicable to this alternative implementation.

The Seamless Mobility Agent (SMA) 151 also has real time knowledge of the operation of each WANx and so can provide the MN 100 with real-time QoS information on each WANx as one contextual factor in selecting a link.

Network Health

Figure 8:
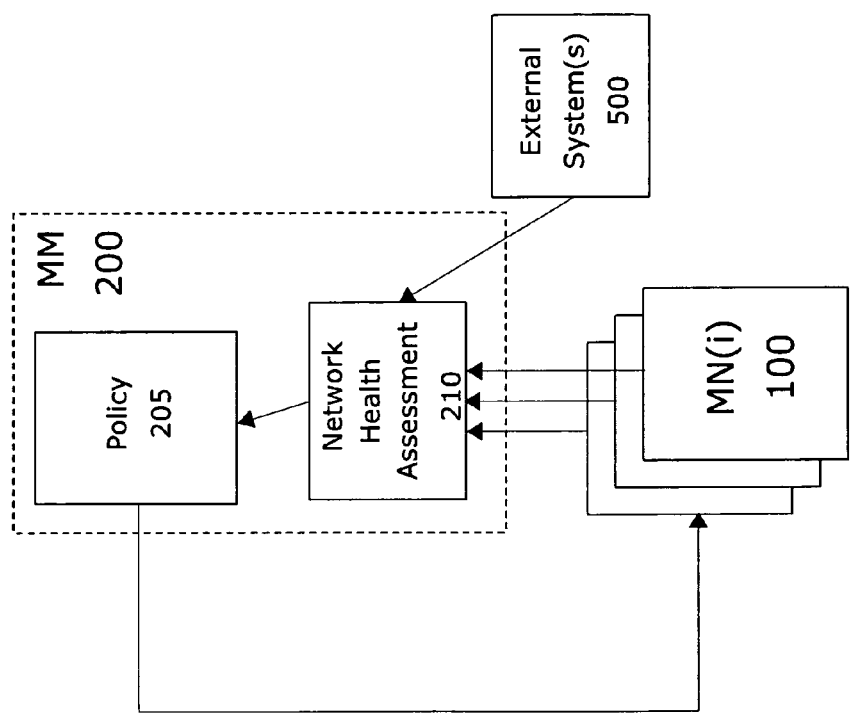
FIG. 8 shows the policy management.

The health of a wireless network is a complex, dynamic combination of a plurality of factors—for examples, the RF environment, status of the RF components, connectivity from the network access point to the destination Inter/intranet, AAA services, etc. Many faults in this complex environment are difficult to detect from any location other than locally by the client that is suffering the faulty service, i.e. physically proximate to the place of fault. Moreover, it is often difficult for cMobile Node (MN) 100 to determine there is a problem until it attempts to connect and pass traffic over the damaged infrastructure—e.g. RF signals may be of good quality, authentication may succeed, but Layer 3 traffic may be blocked or degraded due to downstream network issues. Once an MN 100 has encountered a problem, it would be beneficial for that information to be shared with the, for example, wireless service provider so it can initiate repairs, and also with other MNs 100 so they can avoid the same problem by using alternate networks and/or points of attachment (PoAs) at their disposal. The key is real-time client-side information from the MNs 100. FIG. 8 shows the policy 205 management. MN 100 obtains policy 205 updates from MM 200 both through query and "push" notifications, e.g. for network health-driven policy 205 updates and alerts. Mobility Manager (MM) 200 receives network health reports from Mobile Nodes (MNs) 100 and possibly other inputs from external systems 500 (e.g. network infrastructure monitoring systems) and adjusts policy 205 accordingly through Network Health Assessment 210.

The Mobility Agent (MA) 150 monitors the status of wireless connections via one or more wireless network interfaces WNICx—on a Mobile Node (MN) 100. It detects problems at various levels and reports them to the MM 200. The MM 200 evaluates the report (possibly in conjunction with reports from other MNs 100), diagnoses the global situation, and distributes a warning alert to other MNs 100 that may be affected by the same problem(s), to assist them in making better link selection and handover decisions. The Mobility Manager (MM) 200 may also initiate trouble-tickets to expedite resolution of the detected problem(s). Upon closure of the trouble-ticket, the MM 200 can revoke the problem notification so MNs 100 once again use the associated network infrastructure. Examples of problems detected include: (1) failure to detect signal from a PoA that should be available; (2) failure to associate with an authorized PoA; (3) failure to pass IP traffic after successful association with PoA; and (4) degraded service from PoA and/or parent access network.

For example, a MN 100 enters a vicinity within which Wi-Fi service is expected to be available. The MN 100 activates its Wi-Fi NIC, locates the intended SSID/BSSID and associates successfully, but finds it cannot establish a TCP connection. The MN 100 reconnects to its alternate HSPA connection and notifies the MM 200 of the service outage. The MM 200 correlates this report with other evidence (e.g. reports from other MNs) identifying that BSSID as the source of the problem. The MM 200 then distributes a message to all MNs 100 in or approaching the vicinity advising them to avoid switching to this particular BSSID and simultaneously issues a trouble ticket. While the trouble-ticket is open, the MM 200 continues to advise approaching MNs 100 of the problem. When the trouble-ticket is closed, the MM 200 notifies all MNs 100 in the vicinity that the BSSID is once again available for service.

For another example, MM 200 broadcasts to all non-critical MNs 100 (e.g. mobile devices/equipment that are not critical to public safety) in a particular geographic area to stay clear of spectrum required by public safety personnel responding to an emergency, reserves (or causes the telecom service provider to reserve) particular spectrum, and informs the relevant public safety equipment entering that area, of the spectrum that has been reserved for them.

For other examples, the CWS system operator modifies the policy 205 for a certain class of MNs 100 and their then policy 205 default network, in favor of another default network link, or modifies the weight given to certain contextual factors like cost and QoS.

Overview

From the above, the following overview of the CWS is seen.

The MA 150 is deployed on the mobile device as part of the MN 100 and implements standard IP mobile functionality, and is responsible for: presenting a standard virtual network interface to the IP layer; collecting sensor 105 input and feedback from the RF system; exchanging policy 205 and operational status information with the MM 200; configuring radio(s) in the RF layers selecting the radio link dynamically based on contextual factors; negotiating a secure data path over the selected network link with the Seamless Mobility Agent (SMA) 151; dynamically adjusting the preceding as conditions change; and providing APIs for applications.

The MA 150 can also negotiate a data path with other MAs to form ad-hoc peer-to-peer networks when necessary or desirable/efficient (e.g. central infrastructure has failed or is not available; communication between two co-located mobile devices, sharing of limited back-haul resources, e.g. satellite uplink).

The Seamless Mobility Agent (SMA) 151 is deployed in the service provider's access network or at the customer data center for those who need to roam across multiple service provider networks. The Seamless Mobility Agent (SMA) 151 is responsible for terminating the secure data path from one or more MAs 150. The Seamless Mobility Agent (SMA) 151 implements standard IP Mobility functionality, and has at least the corresponding functionality to interact with the MAs 150 and their functionality (as described above) and also has additional functionality (e.g. multi-streaming and Network Health functionality).

Thus it is seen that working together, the Mobile Agent (MA) 150 and Seamless Mobility Agent (SMA) 151 create a "Layer 2.5", managing multiple Layer 2 links to provide a seamless Layer 3 (IP) operation.

Communication between the Mobile Agent (MA) 150 and Mobility Manager (MM) 200 occurs primarily through messaging at the IP layer. Traffic prioritization schemes such as DiffServ may be used to ensure delivery of high-priority messages ahead of user traffic. In some cases lower-level messaging may be used in cases where it is inefficient or impossible to deliver messages via IP, for example when sending out notifications of large scale network outages or public-safety diversions (clearing portions of the network for public safety use). In these situations layer 2 mechanisms such as the 802.21 Link_SAP may be used to exchange information between the Mobility Manager (MM) 200 and Mobile Agent (MA) 150 even if no IP layer connection to the network (s) exists.

Mobile Node (MN) 100 and Mobile Agent (MA) 150 may be implemented by any computerized system with communication means by which to conduct wired and wireless communications with other entities or parties. In various embodiments, MN 100 may take the form of computer system or a mobile wireless device configured to perform the methods and processes discussed herein. For example, MN 100 may be a cellular phone, personal digital assistant (PDA), portable computer, handheld device or the device described above in connection with FIG. 2. The MN 100 may be found on an emergency vehicle (e.g. police cruiser, ambulance) that is interacting, or interactable with, heterogeneous networks and systems both within the vehicle and without. The range of heterogeneity of networks, interfaces and protocols is not limited and includes common circuit-switched/packet switched networks, WLANs, LANs, Bluetooth, TDMD/CDMA, 2G, 3G, GPRS, Infra-red.

A Mobile Node (MN) 100 may be implemented on a variety of hardware platforms. One possible implementation is to combine a Pentium-class x86 (processor 109) with 256 MB of memory 108 and 1 GB of mass storage 106 implemented using flash memory, and four wireless network interfaces 107 (e.g. Wi-Fi, WiMax, UMTS-HSPA, LTE, EvDO Rev A). Sensor 105 inputs may include GPS, accelerometers, or vehicle computer inputs (engine status, gear selector, etc). Link Selector 152 software may be implemented in a high level language such as Java, C or C++, or (wholly or partially) as firmware. The Mobility Manager (MM) 200 may be implemented in a high level language such as Java, C or C++ using a conventional SQL database (Oracle, MySQL, etc) for storage of configuration and state information as well as event history. The Mobility Manager 200 may be deployed on general purpose hardware. CPU, memory, mass storage and network connection capacity must be allocated based on the number of mobile nodes that the mobility manager is intended to support.

Figure 7:
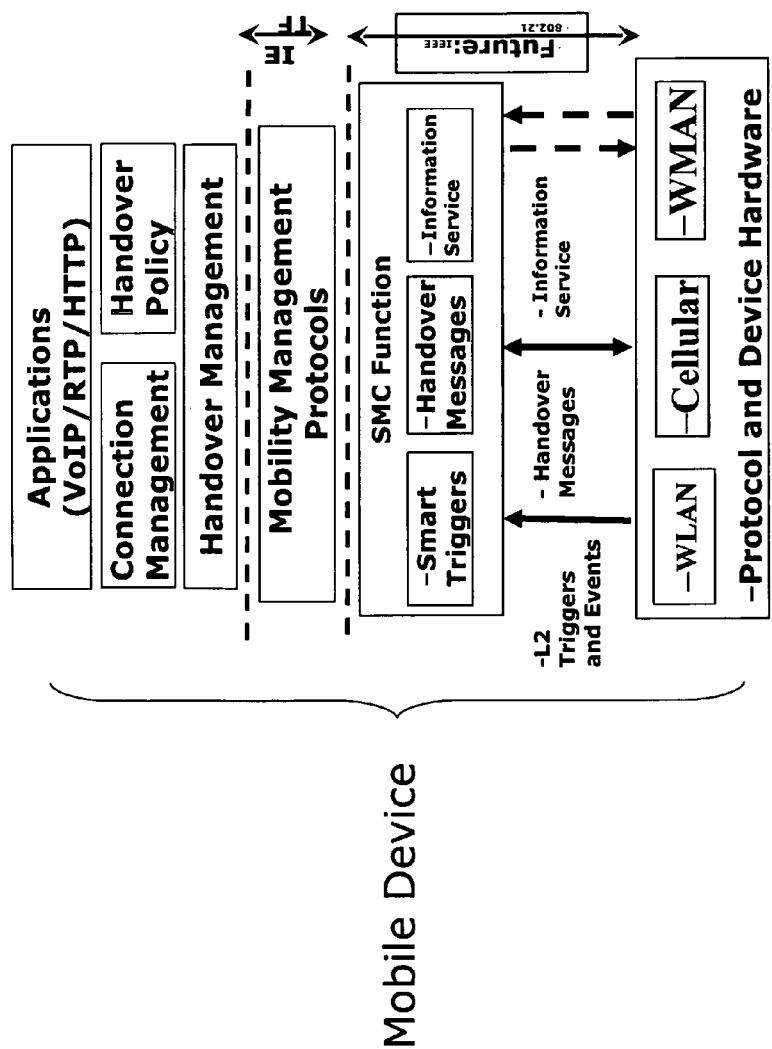
FIG. 7 is a diagram showing Mobile Agent Architecture (based on IEEE 802.21)

FIG. 7 shows a Mobile Agent (MA) 150 architecture based on IEEE 802.21 for standards to enable handover and interoperability between heterogeneous network types including both IEEE 802 and non-802 networks.

References herein to a numbered "Layer" are to the following (Internet) reference model: 5—Application Layer; 4—Transport Layer (eg TCP/UDP); 3—Network Layer (IP); 2—Datalink Layer; and 1—Physical Layer.

Certain words and phrases used throughout this patent document: the terms "include" and "comprise" and derivatives thereof mean inclusion without limitation; the term "or" is inclusive, meaning and/or; the phrases "associated with" and "associated therewith" and derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "manager" means any device, system or part thereof that controls at least one operation, and such a device may be implemented in hardware, firmware or software, or some-combination of at least two of the same. It should be noted that the functionality associated with any particular manager may be centralized or distributed, whether locally or remotely.

Definitions for certain words and phrases are provided throughout this patent document, those of ordinary skill in the art should understand that in many, if not most instances, such definitions apply to prior, as well as future uses of such defined words and phrases. Following are short definitions of the usual meanings of some of the technical terms and abbreviations which are used in the present application. (However, those of ordinary skill will recognize whether the context requires a different meaning.) Additional definitions can be found in the standard technical dictionaries and journals.

WLAN—wireless local area network; a local area network that transmits over the air typically in an unlicensed frequency such as the 2.4 GHz band. Typical WLAN protocols comply with IEEE 802.11 standards.

Bluetooth—A Wireless personal area network (PAN) standard for short-range applications; uses 2.4 GHz band at 720 kbps within 30-foot range. "Bluetooth" is a trademark owned by Telefonaktielbolaget L M Ericsson.

AAA—authentication, authorization and accounting, is the protocols to provides these services. AP—Access Point within Wi-Fi network.

GPS—Global Positioning System is the Global Navigation Satellite System that was developed by the United States Department of Defense.

HIP—Host Identity Protocol.

HSPA—High Speed Packet Access (HSPA) is a collection of mobile telephony protocols that extend and improve the performance of existing UMTS protocols.

MOBIKE is a Mobile and Multi-homing Protocol established by RFC 4555 IKEv2.

Mobile IP—an Internet Engineering Task Force (IETF) standard communications protocol that is designed to allow mobile device users to move from one network to another while maintaining a permanent IP address.

NIC—Network Interface Card, is computer hardware designed to allow computers to communicate over a computer network.

OBD II and variations (e.g. EOBD)—On Board Diagnostics II technology and protocols (which themselves rely on SAE and ISO standards) that refer to a vehicle's self-diagnostic and reporting capability.

PoA—Point of Attachment—is the first point in the network that acts as the MN 100 counterpart for a specific type of communication relationship (e.g., L2, L3, Media Independent Handoff).

QoS—Quality of Service, is the ability to provide different priority to different applications, users, or data flows, or to guarantee a certain level of performance to a data flow within a communication network.

RSVP—Resource Reservation Protocol, is an IETF standard communications protocol that allows end devices to request Quality of Service (QOS) "guarantees" from the communication network.

SIP—Session Initiated Protocol—is an IETF standard communications protocol that is designed for creating, modifying, and terminating sessions with one or more participants.

SSID/BSSID—Service Set Identifier/Basic Service Set Identifier, is a name used to identify the particular WLAN to which a user wants to attach.

SDR—Software Defined Radio

UMA—Unlicensed Mobile Access, is the commercial name of the 3GPP Generic Access Network, or GAN standard.

A communications network has characteristics, including (without limitation) those related to mobility, propagation, cost, latency, data throughput, bursty/regular, security, communications protocol(s). Herein, "heterogeneous networks" are those networks having different characteristics, that a mobile device or mobile node must use as it travels.

Although the method, system and devices of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

A version of a device built according to the disclosure herein, has the following features by way of non-limiting examples.

Compatibility
Operates with WiFi certified client devices
Supports all client operating systems
WAN Wireless Networking
integrated compatibility with current wireless WAN standards including 1×RTT, EVDO, GPRS, GPRS EDGE, UTMS, UMTS TDD (IP Wireless), UMTS HSDPA, Flash-OFDM (Flarion), WIDEN
IEEE 802.11a/b/g
IEEE 802.11-based 4.9 GHz
Satellite
Future compatibility with new wireless WAN standards including 802.18e, 802.20
LAN Networking
Multiple Client Networking Options
IEEE 802.11 b/g (vehicle AP)
Ethernet
Ethernet USB
Serial—PPP
DHCP Server (RFC 2131)
Intercept-based HTTP login
Physical Interfaces
Ethernet—RJ45
USB—USB 1.1×2
Serial—RS232, DB9
IEEE 802.11b/g
Protocols Supported
Transparent support for HTTP, HTTPs, SMTP, POP, IMAP, FTP, etc.
PPP (RFC 2516)
Bluetooth
Mobile IP support (optional)
Security
WLAN
WEP, WPA-TKIP
IEEE 802.11i
Firewall
Port Forwarding
Port Blocking
Encryption
Intel certified VPN compatibility/passthrough
IPSec standard
Supports Cisco EasyVPN client
Open API for remote deployment of current organization standard
Authentication and Accounting
802.1x/RADIUS authentication
Supports 254 concurrent users
Provides accounting by time used or data transferred/received by users
Weight
6.5 lbs/2.9 kg
Power Management
Power Supply
Internal DC to DC converter with power input range of 10-18 VDC
AC adapter (optional)
Power Management System
Auto power-up (demand or schedule)
Graceful power-down
Dimensions
Width: 10.79 in/27.4 cm
Depth: 8.79 in/22.3 cm
Height: 2.37 in/6.0 cm
Platform
AMD Geode LX processor
Linux operating system
Integrated GPS-based reporting based on NMEA 0183 standard (TCP or UDP: local LAN and remote servers)
1 GB solid state IDE drive (Optional: additional 40 GB automotive grade HDD)
Management
Operational support services for fault, configuration, accounting, performance and security (FLAPS)
Real-time tracking
Historical logging
Remote access
Remote software updates
Environmental Specifications
Temperature/Humidity
Operating Temperature: −20° C.-+60° C.
Storage Temperature: −40° C.-+80° C.
Operating Humidity: 10-90% relative humidity; non-condensing
Storage Humidity: 5-95% relative humidity; non-condensing
Vibration/Shock
in accordance with SAE J1455
EMI/EMC
FCC Part 15

We claim:

1. A cognitive wireless system for a mobile node (MN) and a user thereof, to operate dynamically with heterogeneous networks, comprising:
  (a) a first network with characteristics, and a second network with different characteristics;
  (b) a first Mobile Node (MN) and a policy of using said first network as a default and wherein said first Mobile Node (MN) operates on said policy;

(c) said first Mobile Node (MN) having an associated first application with requirements;
wherein said first Mobile Node (MN) monitors the contextual factors of (i) link assessment factor associated with said first default network and link assessment factor associated with said second network; and one or more of (ii) environmental factor, (iii) application factor, and (iv) cost factor; and
wherein said first mobile node (MN) has a link selector that operates on said policy in real time on said contextual factors, and selects said second network to use instead of said first default network by taking into account the user's intentions as inferred by those of said contextual factors whose values are derived by the user's mobility actions with said first Mobile Node (MN);
wherein said user's mobility actions with said first mobile node (MN) include the speed or location of said first mobile node (MN); and
(d) a seamless mobility agent (SMA) to act as a virtual network interface (VNIC) which acts as a proxy for said first mobile node (MN) when interacting with its correspondent node (CN), wherein said first mobile node (MN) has a mobile agent (MA) that has an IP Mobility layer, and said seamless mobility agent (SMA) has a corresponding IP Mobility Home Agent (HA), and said first mobile node mobile agent (MA) registers a plurality of care-of-addresses (CoAs) with said IP Mobility Home Agent (HA), and said mobile agent (MA) sends a multi-streaming message by redundantly and simultaneously streaming the message using two of said plurality of care-of-addresses (CoAs),
wherein said mobile agent (MA) sends said multi-streaming message upon detection of degradation of said contextual factor of link assessment associated with said first default network, and
wherein said sending of multi-streaming message is terminated upon detection of the regaining of an acceptable said contextual factor of link assessment associated with said first default network, and the system then sends a message in a single stream to a single care-of-address (CoA) of said plurality of care-of-addresses (CoAs).

2. The system of claim 1, wherein said first Mobile Node (MN) is provided Global Positioning System (GPS) information about its location and wherein said mobile agent (MA) sends said multi-streaming message in response to said first Mobile Node (MN) location.

3. The system of claim 1, wherein said first Mobile Node (MN) is provided information about its acceleration and wherein said mobile agent (MA) sends said multi-streaming message in response to said first Mobile Node (MN) acceleration.

* * * * *